United States Patent
Xi et al.

(10) Patent No.: US 9,026,728 B1
(45) Date of Patent: May 5, 2015

(54) DISK DRIVE APPLYING FEED-FORWARD COMPENSATION WHEN WRITING CONSECUTIVE DATA TRACKS

(71) Applicant: Western Digital Technologies, Inc., Irvine, CA (US)

(72) Inventors: Wei Xi, Mission Viejo, CA (US); Jianguo Zhou, Foothill Ranch, CA (US)

( * ) Notice: Subject to any disclaimer, the term of this patent is extended or adjusted under 35 U.S.C. 154(b) by 0 days.

(21) Appl. No.: 13/911,365

(22) Filed: Jun. 6, 2013

(51) Int. Cl.
*G06F 13/00* (2006.01)
*G11B 21/10* (2006.01)

(52) U.S. Cl.
CPC .................................. *G11B 21/106* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,215,608 B1 | 4/2001 | Serrano et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |

(Continued)

OTHER PUBLICATIONS

Daniel J. Gunderson, et al., U.S. Appl. No. 13/246,600, filed Sep. 27, 2011, 17 pgs.

*Primary Examiner* — K. Wong

(57) ABSTRACT

A disk drive is disclosed comprising a disk comprising a plurality of servo tracks defined by servo sectors, a head actuated over the disk, and control circuitry comprising a servo control system operable to servo the head over the disk. A plurality of data tracks are defined relative to the servo tracks, and a first data track is accessed while servoing the head over the first data track based on a position error signal $X_{n-1}(k)$ generated at each servo sector of the first data track. Feed-forward compensation values are generated based on $X_{n-1}(k)$, and a second, consecutive data track is accessed while servoing the head over the second data track based on a position error signal $X_n(k)$ generated at each servo sector of the second data track and based on the feed-forward compensation values.

22 Claims, 5 Drawing Sheets

(56) References Cited

U.S. PATENT DOCUMENTS

| | | | |
|---|---|---|---|
| 6,493,169 B1 | 12/2002 | Ferris et al. |
| 6,496,320 B1 | 12/2002 | Liu |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,717,757 B1 | 4/2004 | Levy et al. |
| 6,724,564 B1 | 4/2004 | Codilian et al. |
| 6,731,450 B1 | 5/2004 | Codilian et al. |
| 6,735,033 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,262 B1 | 9/2004 | Codilian et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,968,422 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,931 B2 * | 9/2007 | Ehrlich ............... 360/77.02 |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,474,491 B2 | 1/2009 | Liikanen et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |

(56) References Cited

U.S. PATENT DOCUMENTS

| | | | |
|---|---|---|---|
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,545,593 B1 | 6/2009 | Sun et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 * | 12/2009 | Yu et al. ............... 360/78.04 |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, Iii et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | Mcfadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |
| 2012/0162806 A1 | 6/2012 | Champion et al. |
| 2012/0284493 A1 | 11/2012 | Lou et al. |
| 2012/0307400 A1 | 12/2012 | Kawabe |
| 2013/0120870 A1 | 5/2013 | Zhou et al. |
| 2013/0148240 A1 | 6/2013 | Ferris et al. |

\* cited by examiner

DISK DRIVE APPLYING FEED-FORWARD COMPENSATION WHEN WRITING CONSECUTIVE DATA TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

The LBA to PBA mapping may also facilitate log structured writes wherein at least part of the disk is written as a circular buffer. For example, the circular buffer may be written from an outer diameter track toward an inner diameter track, and then circle back to the outer diameter track. Data is written to the head of the circular buffer such that the LBAs of new write commands are mapped to the PBAs of the corresponding data sectors. When the same LBA is written by the host, the data is written to a new PBA at the head of the circular buffer and the old PBA is marked invalid so that it may be overwritten. During a garbage collection operation, valid PBAs previously written in the circular buffer may be relocated to the head of the circular buffer so that the old PBAs may be overwritten. In one embodiment, the tracks are written in a shingled manner such that a previously written track is partially overwritten, thereby increasing the overall capacity of the disk drive.

DETAILED DESCRIPTION

Figure 1:
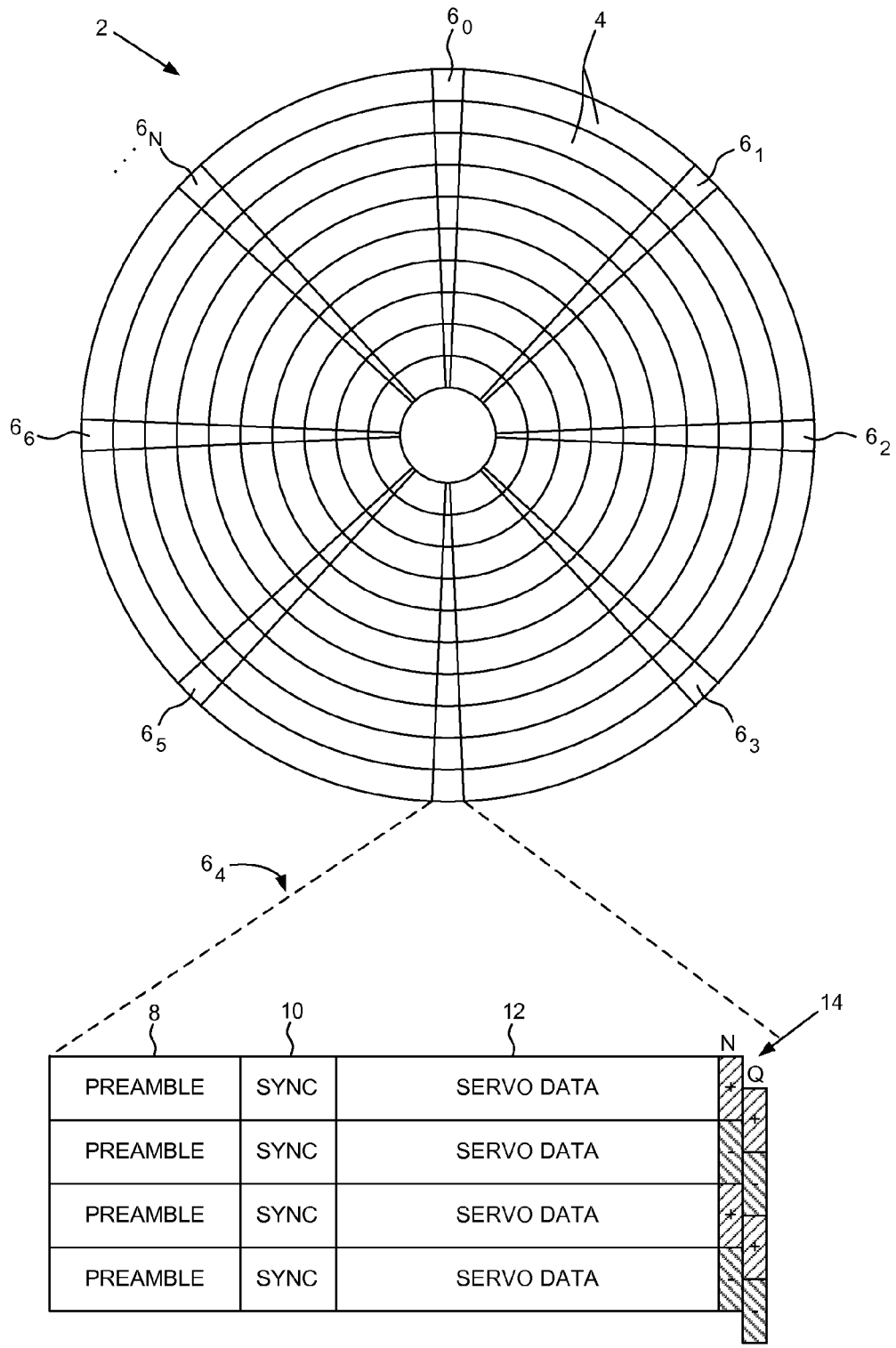
FIG. 1 shows a prior art disk format comprising a plurality of servo tracks defined by servo sectors.
Figure 2A:
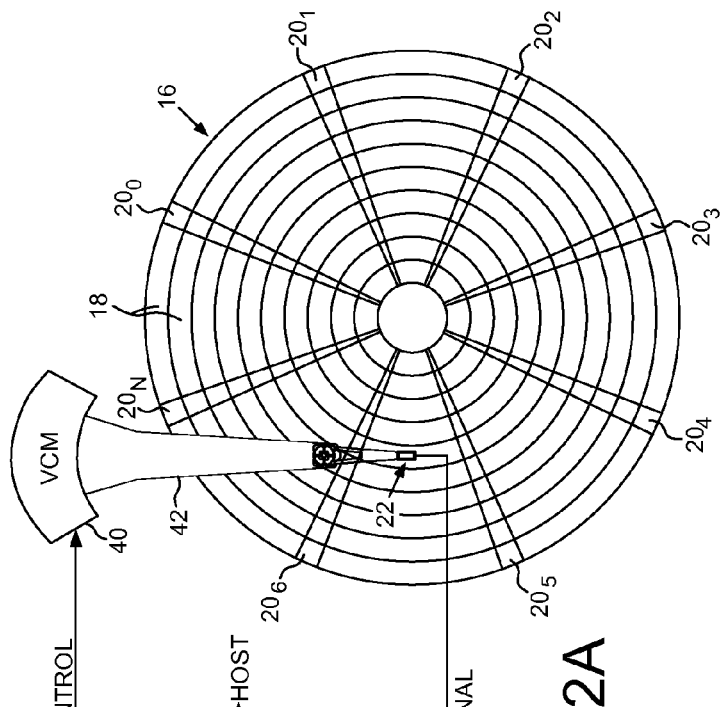
FIG. 2A shows a disk drive according to an embodiment comprising control circuitry including a servo control system operable to actuate a head over a disk.
Figure 2B:
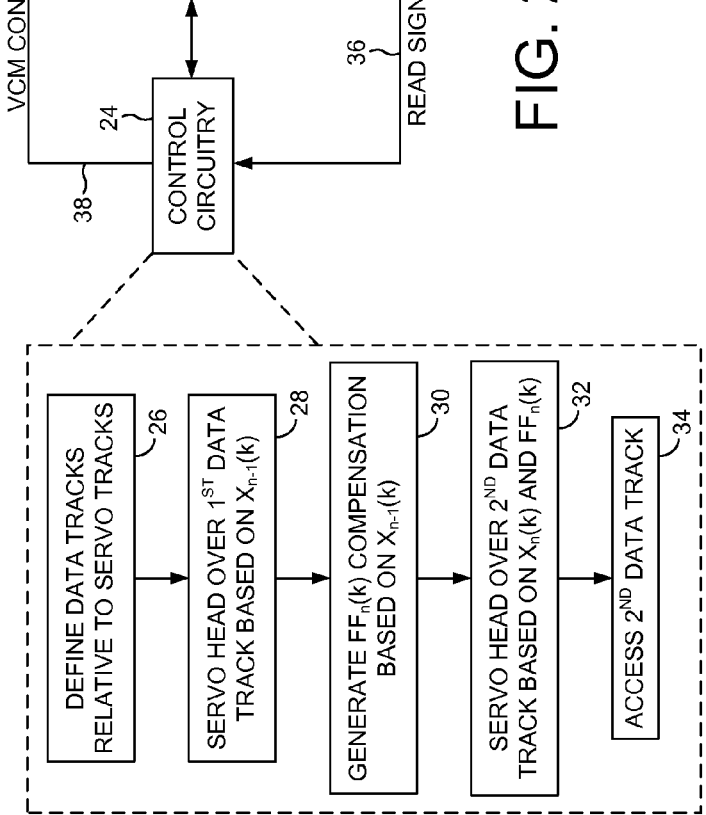
FIG. 2B is a flow diagram according to an embodiment wherein feed-forward compensation values are generated based on a position error signal generated when servoing on a first data track, wherein the feed-forward compensation values are used to servo the head over a second data track.

FIG. 2A shows a disk drive according to an embodiment comprising a disk 16 comprising a plurality of servo tracks 18 defined by servo sectors $20_0$-$20_N$, a head 22 actuated over the disk 16, and control circuitry 24 comprising a servo control system operable to servo the head 22 over the disk 16. The control circuitry 24 is operable to execute the flow diagram of FIG. 2B, wherein a plurality of data tracks are defined relative to the servo tracks (block 26), and a first data track is accessed while servoing the head over the first data track based on a position error signal $X_{n-1}(k)$ generated at each servo sector of the first data track (block 28). Feed-forward compensation values are generated based on $X_{n-1}(k)$ (block 30), and a second, consecutive data track is accessed (block 34) while servoing the head over the second data track based on a position error signal $X_n(k)$ generated at each servo sector of the second data track and based on the first feed-forward compensation values (block 32).

In the embodiment of FIG. 2A, the control circuitry 24 processes a read signal 36 emanating from the head 22 to demodulate the servo sectors $20_0$-$20_N$ and generate a position error signal (PES) representing an error between the actual position of the head and a target position relative to a target track. The control circuitry 24 filters the PES using a suitable compensation filter to generate a control signal 38 applied to a voice coil motor (VCM) 40 which rotates an actuator arm 42 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

Figure 2C:
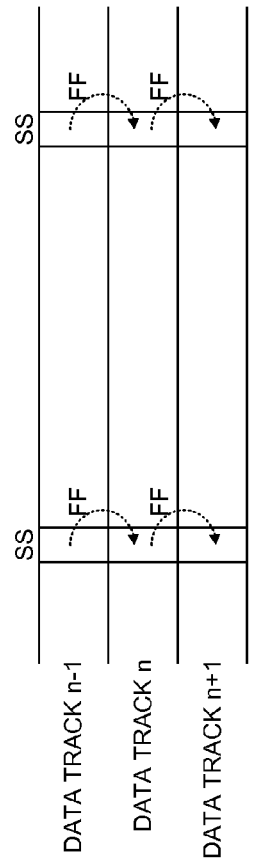
FIG. 2C shows an embodiment wherein the second servo track is consecutive with the first servo track.

FIG. 2C illustrates an embodiment wherein the data tracks are written in a consecutive manner, such as in a log structured system where data received from a host is written to consecutive data tracks using a dynamic LBA to PBA mapping system. In one embodiment, the consecutive data tracks may be written in an overlapping (shingled) manner in order to increase a radial density of the data tracks. As shown in the embodiment of FIG. 2C, feed-forward compensation values are generated based on the servo sectors of a previous data track, where the feed-forward compensation values are used to servo the head while accessing a next data track (e.g., while writing data to the next data track). In this manner, the head may be servoed over the next data track based on a non-circular target reference so as to reduce the chance of aborting a write operation due to an off-track condition.

Figure 3:
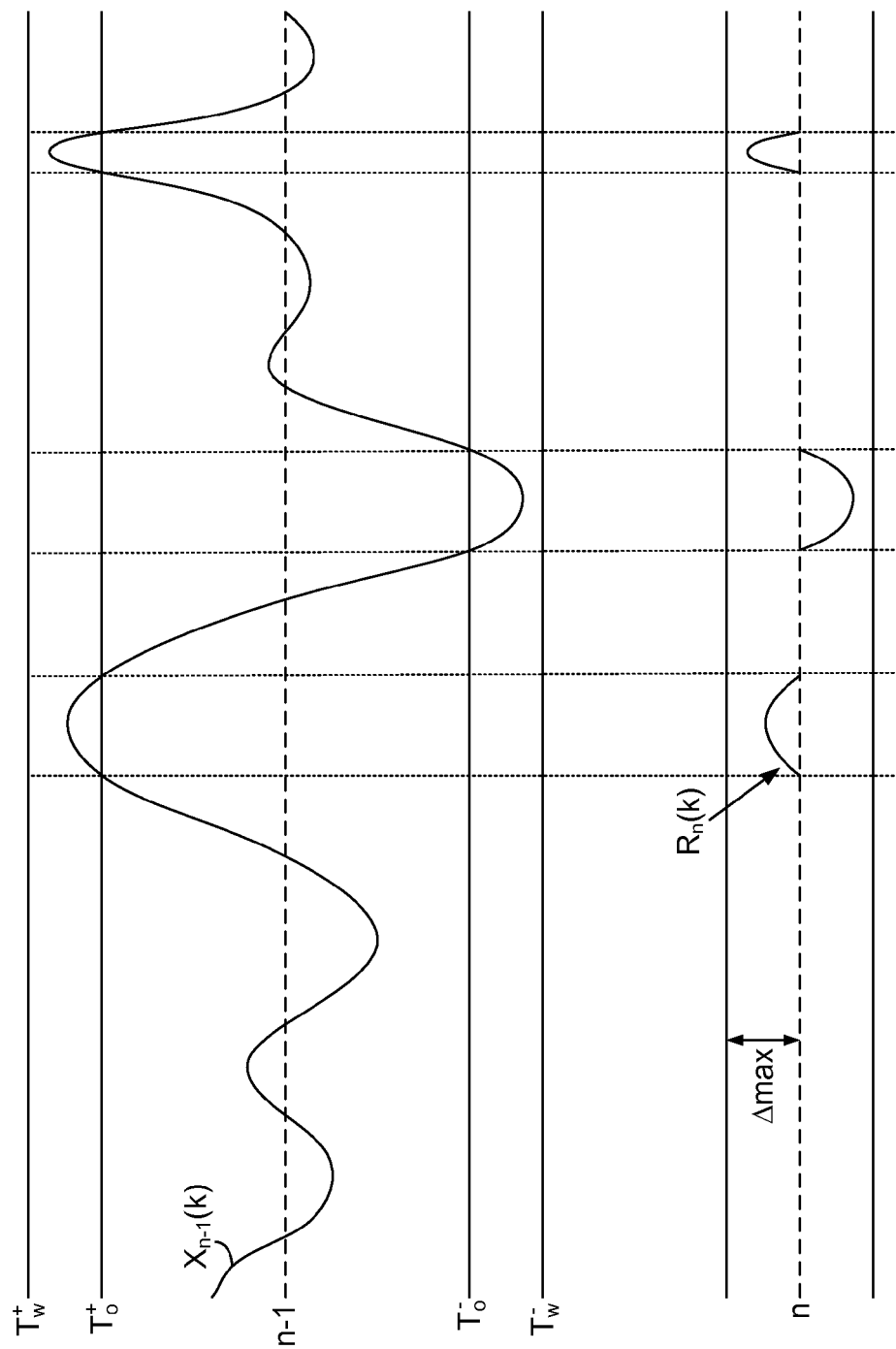
FIG. 3 illustrates how a reference offset for servoing the head over the second data track is generated based on the position error signal generated while servoing over the first data track according to an embodiment.

An example of this embodiment is illustrated in FIG. 3 wherein a position error signal $X_{n-1}(k)$ is generated at each servo sector of a first data track. If the position error signal $X_{n-1}(k)$ were to exceed a first threshold $T_w$, the write operation would have been aborted. When the position error signal $X_{n-1}(k)$ exceeds a second threshold $T_o$ lower than the first threshold $T_w$, a corresponding non-zero reference offset $R_n(k)$ is generated for the second data track as illustrated in FIG. 3. That is, the reference offset $R_n(k)$ is generated based on:

$$R_n(k) = \begin{cases} \min(X_{n-1}(k) - T_o^+, \Delta_{max}^+) & X_{n-1}(k) > T_o^+ \\ 0 & T_o^- < X_{n-1}(k) < T_o^+ \\ \max(X_{n-1}(k) - T_o^-, \Delta_{max}^-) & X_{n-1}(k) < T_o^- \end{cases}$$

where $T_o^+$ represents a threshold toward the first data track, $T_o^-$ represents a threshold toward a next data track after the second data track, and $\Delta_{max}^+$ and $\Delta_{max}^-$, a maximum of $|R_n(k)|$.

Figure 4:
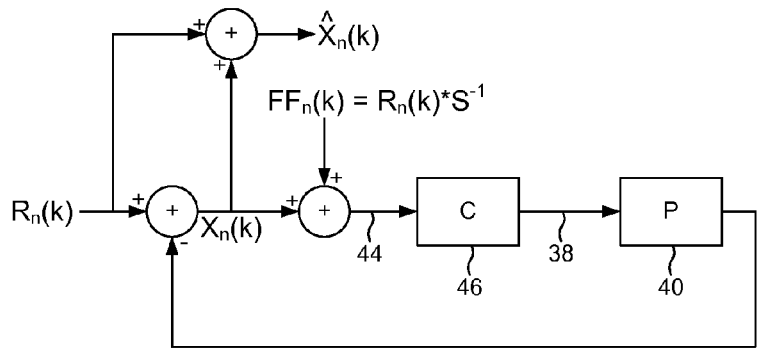
FIG. 4 shows a servo control system according to an embodiment wherein the feed-forward compensation values are generated by convolving the reference offset with an inverse of a sensitivity function of the servo control system.

FIG. 4 shows a servo control system according to an embodiment for servoing the head while writing data to the second data track. A position error signal $X_n(k)$ is generated by subtracting a measured position of the head (as determined from reading the $k^{th}$ servo sector) from the reference offset $R_n(k)$ shown in FIG. 3. Feed-forward compensation values $FF_n(k)$ are generated for the second data track by convolving the reference offset $R_n(k)$ with an inverse of a sensitivity function $S^{-1}$ of the servo control system. The feed-forward compensation value $FF_n(k)$ at the $k^{th}$ servo sector is added to the position error signal $X_n(k)$ to generate an error signal 44 that is filtered by a suitable compensator 46 to generate the control signal 38 applied to the VCM 40 (or other suitable actuator). The non-zero reference offset $R_n(k)$ and the corresponding feed-forward compensation values $FF_n(k)$ cause the head to deviate in a direction that corresponds to the deviations that occurred while writing data to the first data track as illustrated in FIG. 3, thereby reducing the chance of aborting the write operation due to an off-track write condition.

Figure 5:
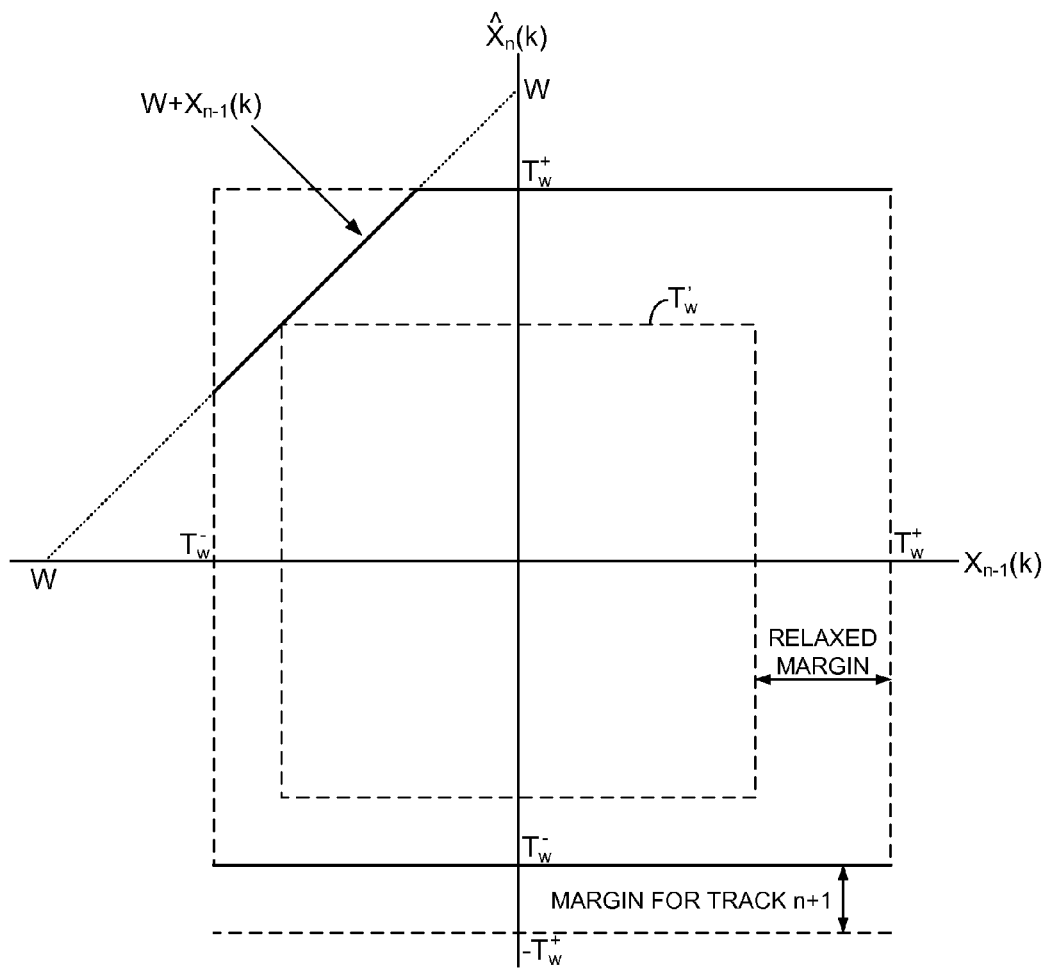
FIG. 5 illustrates an embodiment wherein a write operation to the second data track is aborted when a position error signal of the second data track exceeds an unsafe threshold based on a position error signal of the first data track.

Referring again to FIG. 3, an off-track write condition occurs when the position error signal exceeds an unsafe threshold $T_w$ that corresponds to a minimum allowed spacing between adjacent data tracks (track squeeze). If the position error signal $X_{n-1}(k)$ of a previous data track deviates toward the next data track, it reduces the track squeeze margin allowed when writing to the next data track. In one embodiment, the unsafe threshold $T_w$ for aborting a write operation may be configured to assume the worst case condition for the position error signal generated for a previous and current data track. This is illustrated in FIG. 5 which shows a rectangle designated by unsafe threshold $T_w'$ representing the worst case condition for the position error signal. Accordingly, if the position error signal $X_{n-1}(k)$ of a previous data track or the position error signal $X_n(k)$ of a current data track exceeds the unsafe threshold $T_w'$, the write operation is aborted. However, since the worst case condition for the position error signal does not always occur, a write operation may be aborted unnecessarily when employing the worst case unsafe threshold $T_w'$.

According, in one embodiment a variable unsafe threshold $T_w$ is used to abort the write operation to the second data track that is based on the position error signal $X_{n-1}(k)$ of the first data track. In this embodiment, the unsafe threshold $T_w$ is based on:

$$[\min(T_w^+, W+X_{n-1}(k)), T_w^-]$$

where $T_w^+$; represents a maximum threshold toward the first data track, $T_w^-$; represents a maximum threshold toward a next data track following the second data track, and W is a predetermined constant based on a squeeze limit between the first and second data tracks. As can be seen in FIG. 5, the maximum threshold $T_w^+$ toward the first data track decreases as the position error signal $X_{n-1}(k)$ for the first data track increases toward the second data track (i.e., becomes more negative). This variable unsafe threshold $T_w^+$ provides an increased margin as compared to unsafe threshold $T_w^-$ which may allow a write operation to continue without exceeding the track squeeze limit. In the embodiment of FIG. 5, the magnitude of the maximum threshold $T_w^-$ is configured to be less than the magnitude of $T_w^+$ in order to provide margin for the next track.

In one embodiment, when deciding whether to abort a write operation while writing data to the second data track, a position error signal $\hat{X}_n(k)$ is generated as shown in FIG. 4 by adding $X_n(k)$ to $R_n(k)$. This adjusted position error signal $\hat{X}_n(k)$ is then compared to the unsafe thresholds as shown in FIG. 5 to determine whether to abort the write operation when writing to the second data track. That is, the write operation is aborted when the position error signal $\hat{X}_n(k)$ relative to the center of the second data track exceeds the unsafe threshold.

In one embodiment, the adjusted position error signal $\hat{X}_n(k)$ is also used to generate the feed-forward compensation values for the next data track (a third data track following the second data track). That is, the non-zero reference offset $R_{n+1}(k)$ is generated for the third data track based on when $\hat{X}_n(k)$ of the second data track exceeds the threshold $T_o$ as shown in the example of FIG. 3.

Figure 6:
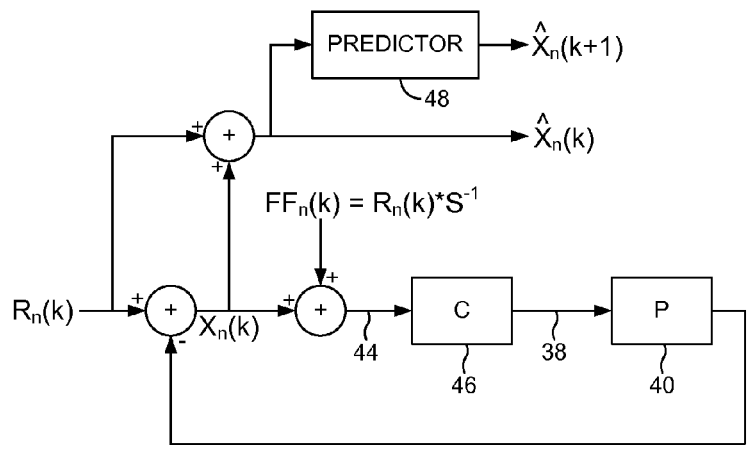
FIG. 6 shows a servo control system according to an embodiment wherein a predicted position error signal is generated.

FIG. 6 shows a servo control system according to an embodiment wherein a predictor 48 process the position error signal $\hat{X}_n(k)$ to generate a predicted position error signal $\hat{X}_n(k+1)$ for a next servo sector (servo sector k+1). The predictor 48 may implement any suitable prediction algorithm, wherein in one embodiment the predicted position error signal $\hat{X}_n(k+1)$ is generated based on:

$$\hat{X}_n(k+1) = 2 \cdot \hat{X}_n(k) - \hat{X}_n(k-1).$$

Figure 7:
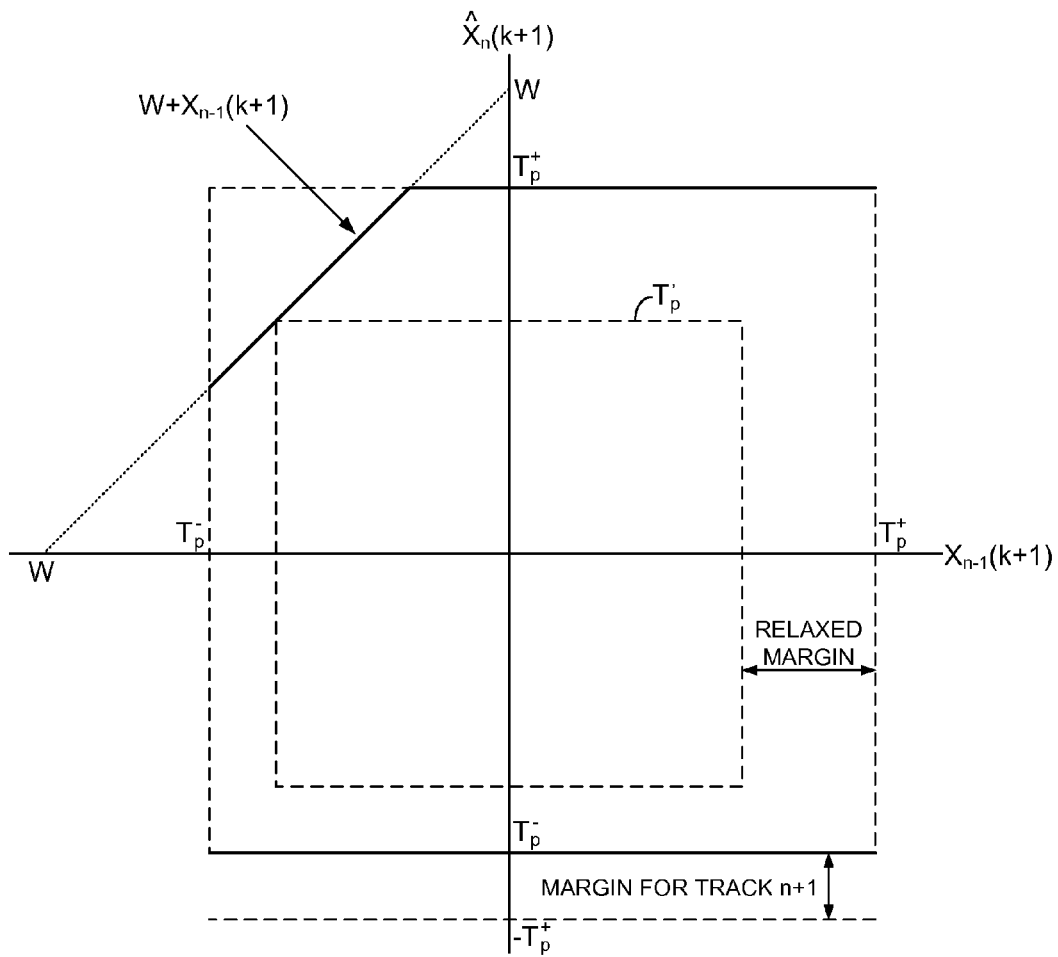
FIG. 7 illustrates an embodiment wherein a write operation to the second data track is aborted when the predicted position error signal exceeds an unsafe threshold based on a position error signal of the first data track.

FIG. 7 shows an embodiment wherein a variable unsafe threshold $T_p$ is generated based on the position error signal $X_{n-1}(k+1)$ generated for the first servo track at servo sector k+1 similar to the unsafe threshold $T_w$ described above with reference to FIG. 5. That is, the unsafe threshold $T_p$ may be generated based on:

$$[\min(T_p^+, W+X_{n-1}(k+1)), T_p^-]$$

and the write operation aborted if the predicted position error signal $\hat{X}_n(k+1)$ exceeds the unsafe threshold $T_p$. In one embodiment, the unsafe threshold $T_p$ of FIG. 7 may be less than the unsafe threshold $T_w$ of FIG. 5 to compensate for the error in predicting the position error at the next servo sector.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk comprising a plurality of servo tracks defined by servo sectors;
a head actuated over the disk; and
control circuitry comprising a servo control system operable to servo the head over the disk, the control circuitry operable to:
define a plurality of data tracks relative to the servo tracks, wherein each data track comprises a plurality of data sectors;
access a first data track while servoing the head over the first data track based on a position error signal $X_{n-1}(k)$ generated at each servo sector of the first data track;
generate first feed-forward compensation values based on $X_{n-1}(k)$; and
access a second data track while servoing the head over the second data track based on a position error signal $X_n(k)$ generated at each servo sector of the second data track and based on the first feed-forward compensation values,
wherein:
the second data track is consecutive with the first data track;
the access of the first data track accesses at least one data sector in the first data track; and
the access of the second data track accesses at least one data sector in the second data track.

2. The disk drive as recited in claim 1, wherein the control circuitry is operable to generate the first feed-forward compensation values based on a reference offset $R_n(k)$ generated based on $$R_n(k) = \begin{cases} \min(X_{n-1}(k) - T_o^+, \Delta_{max}^+) & X_{n-1}(k) > T_o^+ \\ 0 & T_o^- < X_{n-1}(k) < T_o^+ \\ \max(X_{n-1}(k) - T_o^-, \Delta_{max}^-) & X_{n-1}(k) < T_o^- \end{cases}$$

where:
$T_o^+$ represents a threshold toward the first data track;
$T_o^-$ represents a threshold toward a next data track after the second data track;
$\Delta_{max}^+$ and $\Delta_{max}^-$ bound a maximum of $|R_n(k)|$.

3. The disk drive as recited in claim 2, wherein the control circuitry is operable to generate the first feed-forward compensation based on:

$$R_n(X_{n-1})*S^{-1}$$

wherein $S^{-1}$ represents an inverse of a sensitivity function of the servo control system.

4. The disk drive as recited in claim 2, wherein the control circuitry is operable to generate the position error signal $X_n(k)$ based on a nominal centerline of the second data track offset by the reference offset $R_n(k)$.

5. The disk drive as recited in claim 4, wherein the control circuitry is further operable to:
generate a position error signal $\hat{X}_n(k)$ by adding $X_n(k)$ to $R_n(k)$;
generate a first unsafe threshold based on $X_{n-1}(k)$; and
abort the access of the second data track based on the first unsafe threshold.

6. The disk drive as recited in claim 5, wherein the control circuitry is operable to abort the access of the second data track when $\hat{X}_n(k)$ exceeds the first unsafe threshold.

7. The disk drive as recited in claim 6, wherein the first unsafe threshold is based on:

$$[\min(T_w^+, W + X_{n-1}(k)), T_w^-]$$

where:
$T_w^+$ represents a maximum threshold for $\hat{X}_n(k)$ toward the first data track;
$T_w^-$ represents a maximum threshold for $\hat{X}_n(k)$ toward a next data track following the second data track; and
W is a predetermined constant based on a squeeze limit between the first and second data tracks.

8. The disk drive as recited in claim 5, wherein the control circuitry is operable to:

generate a predicted position error signal $\hat{X}_n(k+1)$ based on $\hat{X}_n(k)$;

generate a second unsafe threshold based on $X_{n-1}(k+1)$; and abort the access of the second data track based on the second unsafe threshold.

9. The disk drive as recited in claim 8, wherein the control circuitry is operable to abort the access of the second data track when $\hat{X}_n(k+1)$ exceeds the second unsafe threshold.

10. The disk drive as recited in claim 9, wherein the second unsafe threshold is based on:

$$[\min(T_p^+, W+X_{n-1}(k+1)), T_p^-]$$

where:

$T_p^+$ represents a maximum threshold for $\hat{X}_n(k+1)$ toward the first data track;

$T_p^-$ represents a maximum threshold for $\hat{X}_n(k+1)$ toward a next data track following the second data track; and W is a predetermined constant based on a squeeze limit between the first and second data tracks.

11. The disk drive as recited in claim 4, wherein the control circuitry is operable to:

generate a position error signal $\hat{X}_n(k)$ by adding $X_n(k)$ to $R_n(k)$;

generate second feed-forward compensation values based on $\hat{X}_n(k)$; and access a third data track while servoing the head over the second data track based on a position error signal $X_{n+1}(k)$ generated at each servo sector of the third data track and based on the second feed-forward compensation values, wherein the third data track is consecutive with the second data track.

12. A method of operating a disk drive comprising a disk comprising a plurality of servo tracks defined by servo sectors, a head actuated over the disk, and control circuitry comprising a servo control system operable to servo the head over the disk, the method comprising:

defining a plurality of data tracks relative to the servo tracks, wherein each data track comprises a plurality of data sectors;

accessing a first data track while servoing the head over the first data track based on a position error signal $X_{n-1}(k)$ generated at each servo sector of the first data track;

generating first feed-forward compensation values based on $X_{n-1}(k)$; and accessing a second data track while servoing the head over the second data track based on a position error signal $X_n(k)$ generated at each servo sector of the second data track and based on the first feed-forward compensation values, wherein:

the second data track is consecutive with the first data track;

the access of the first data track accesses at least one data sector in the first data track; and the access of the second data track accesses at least one data sector in the second data track.

13. The method as recited in claim 12, further comprising generating the first feed-forward compensation values based on a reference offset $R_n(k)$ generated based on $$R_n(k) = \begin{cases} \min(X_{n-1}(k) - T_o^+, \Delta_{max}^+) & X_{n-1}(k) > T_o^+ \\ 0 & T_o^- < X_{n-1}(k) < T_o^+ \\ \max(X_{n-1}(k) - T_o^-, \Delta_{max}^-) & X_{n-1}(k) < T_o^- \end{cases}$$

where:

$T_o^+$ represents a threshold toward the first data track;

$T_o^-$ represents a threshold toward a next data track after the second data track;

$\Delta_{max}^+$ and $\Delta_{max}^-$ bound a maximum of $|R_n(k)|$.

14. The method as recited in claim 13, further comprising generating the first feed-forward compensation based on:

$$R_n(X_{n-1})*S^{-1}$$

wherein $S^{-1}$ represents an inverse of a sensitivity function of the servo control system.

15. The method as recited in claim 13, further comprising generating the position error signal $X_n(k)$ based on a nominal centerline of the second data track offset by the reference offset $R_n(k)$.

16. The method as recited in claim 15, further comprising:

generating a position error signal $\hat{X}_n(k)$ by adding $X_n(k)$ to $R_n(k)$;

generating a first unsafe threshold based on $X_{n-1}(k)$; and aborting the access of the second data track based on the first unsafe threshold.

17. The method as recited in claim 16, further comprising aborting the access of the second data track when $\hat{X}_n(k)$ exceeds the first unsafe threshold.

18. The method as recited in claim 17, wherein the first unsafe threshold is based on:

$$[\min(T_w^+, W+X_{n-1}(k)), T_w^-]$$

where:

$T_w^+$ represents a maximum threshold for $\hat{X}_n(k)$ toward the first data track;

$T_w^-$ represents a maximum threshold for $\hat{X}_n(k)$ toward a next data track following the second data track; and W is a predetermined constant based on a squeeze limit between the first and second data tracks.

19. The method as recited in claim 16, further comprising:

generating a predicted position error signal $\hat{X}_n(k+1)$ based on $\hat{X}_n(k)$;

generating a second unsafe threshold based on $X_{n-1}(k+1)$; and aborting the access of the second data track based on the second unsafe threshold.

20. The method as recited in claim 19, further comprising aborting the access of the second data track when $\hat{X}_n(k+1)$ exceeds the second unsafe threshold.

21. The method as recited in claim 20, wherein the second unsafe threshold is based on:

$$[\min(T_p^+, W+X_{n-1}(k)), T_p^-]$$

where:

$T_p^+$ represents a maximum threshold for $\hat{X}_n(k+1)$ toward the first data track;

$T_p^-$ represents a maximum threshold for $\hat{X}_n(k+1)$ toward a next data track following the second data track; and W is a predetermined constant based on a squeeze limit between the first and second data tracks.

22. The method as recited in claim 15, further comprising:

generating a position error signal $\hat{X}_n(k)$ by adding $X_n(k)$ to $R_n(k)$;

generating second feed-forward compensation values based on $\hat{X}_n(k)$; and accessing a third data track while servoing the head over the second data track based on a position error signal $X_{n+1}(k)$ generated at each servo sector of the third data track and based on the second feed-forward compensation values, wherein the third data track is consecutive with the second data track.

* * * * *